United States Patent
Menjak et al.

(10) Patent No.: US 7,661,711 B2
(45) Date of Patent: Feb. 16, 2010

(54) STEERING COLUMN ASSEMBLY WITH ACTIVE ENERGY ABSORPTION DEVICE

(75) Inventors: Ratko Menjak, Frankenmuth, MI (US); Brian J. Magnus, Frankenmuth, MI (US); Karen A. Boswell, Freeland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 295 days.

(21) Appl. No.: 11/586,806

(22) Filed: Oct. 26, 2006

(65) Prior Publication Data

US 2008/0100050 A1 May 1, 2008

(51) Int. Cl.
*B62D 1/00* (2006.01)
(52) U.S. Cl. .................................. 280/777
(58) Field of Classification Search ............ 280/777, 280/775, 779; 74/493
See application file for complete search history.

(56) References Cited

U.S. PATENT DOCUMENTS

| | | | | | |
|---|---|---|---|---|---|
| 3,769,851 | A | * | 11/1973 | Edme et al. | 74/492 |
| 5,082,311 | A | * | 1/1992 | Melotik | 280/777 |
| 5,115,691 | A | * | 5/1992 | Beauch | 74/493 |
| 5,470,107 | A | * | 11/1995 | Muntener et al. | 280/777 |
| 6,339,970 | B1 | | 1/2002 | Blex | |
| 6,378,903 | B1 | * | 4/2002 | Yabutsuka et al. | 280/777 |
| 6,523,432 | B1 | | 2/2003 | Yamamoto et al. | |
| 6,575,497 | B1 | * | 6/2003 | McCarthy et al. | 280/777 |
| 6,578,872 | B2 | | 6/2003 | Duval et al. | |
| 6,652,002 | B2 | | 11/2003 | Li et al. | |
| 6,655,716 | B2 | | 12/2003 | Riefe | |
| 6,685,225 | B2 | * | 2/2004 | Hancock et al. | 280/777 |
| 6,749,222 | B2 | | 6/2004 | Manwaring et al. | |
| 6,863,306 | B2 | * | 3/2005 | Bechtel et al. | 280/775 |
| 7,178,833 | B2 | * | 2/2007 | Cymbal et al. | 280/777 |
| 7,393,014 | B2 | * | 7/2008 | Bechtel et al. | 280/777 |
| 2002/0053252 | A1 | * | 5/2002 | Duffy | 74/492 |
| 2003/0000330 | A1 | * | 1/2003 | Murakami et al. | 74/492 |
| 2003/0102658 | A1 | * | 6/2003 | McCarthy et al. | 280/777 |
| 2005/0012316 | A1 | * | 1/2005 | Ben Rhouma et al. | 280/777 |

* cited by examiner

*Primary Examiner*—Faye M. Fleming
(74) *Attorney, Agent, or Firm*—Cantor Colburn LLP

(57) ABSTRACT

A collapsible steering column assembly is provided that includes a column jacket and a bracket for attaching the assembly to a vehicle. A plate is coupled to the column jacket, and defines a opening therethrough and a slot extending along a longitudinal axis from the opening. A pyrotechnic device interconnects the bracket to a pin, and transversely moves the pin relative to the plate into the opening in response to a collision event. The pin deforms the slot as a result of longitudinal movement of the plate relative to the pin for absorbing energy imparted to the vehicle during the collision event, thereby reducing the likelihood of injuring a driver of the vehicle.

15 Claims, 5 Drawing Sheets

STEERING COLUMN ASSEMBLY WITH ACTIVE ENERGY ABSORPTION DEVICE

BACKGROUND OF THE INVENTION

1. Field of the Invention

The subject invention relates to a collapsible steering column assembly, and more specifically to an energy absorption device for the collapsible steering column assembly.

2. Description of the Prior Art

Currently, many steering column assemblies are equipped with kinetic energy absorption devices to reduce a likelihood of injury resulting from a vehicular accident. There are several different types and variations of these kinetic energy absorption devices, typically involving the deformation of a plastically deformable metal. An example of such a kinetic energy absorption device is disclosed in U.S. Pat. No. 6,523,432 to Yamamoto (the '432 patent).

The '432 patent discloses a collapsible steering column assembly comprising a steering shaft supported within a column jacket and extending along a longitudinal axis. A bracket is mounted to the column jacket, and attaches the steering column assembly to a vehicle. The bracket defines a bolt hole extending transverse to the longitudinal axis, and a slot extending from the bolt hole parallel the longitudinal axis. The slot includes a pre-determined width less than a diameter of the bolt hole. A bolt having a shank within a collar is disposed within the bolt hole so as to deform edges of the slot as a result of the steering column collapsing along the longitudinal axis during a collision event. The amount of energy absorbed by the energy absorption device disclosed in the '432 patent depends upon material properties and physical dimensions of the components of the energy absorption device, and cannot be altered once the components of the energy absorption device have been installed on the steering column.

SUMMARY OF THE INVENTION AND ADVANTAGES

The subject invention provides a collapsible steering column assembly for a vehicle. The assembly comprises a column jacket, and a bracket for attaching the assembly to the vehicle slidable relative to the bracket along a longitudinal axis. A plate is attached to one of the bracket and the column jacket, and defines an opening and a slot extending from the opening parallel the longitudinal axis. The slot defines a pre-determined width. A pin is coupled to one of the bracket and the column jacket and is horizontally moveable relative to the plate along the longitudinal axis during the collision event. The pin includes a diameter greater than the pre-determined width of the slot, and is transversely moveable along a transverse axis, relative to the plate. The pin is moveable between a disengaged position withdrawn from the opening and an engaged position extending into the opening and engaging the slot. The pin engages the slot in response to the horizontal movement of the plate relative to the pin.

Accordingly, the steering column assembly disclosed by the subject invention provides a simple energy absorbing device capable of absorbing varying amounts of energy during an accident, e.g., by moving the moveable pin from the disengaged position to the engaged position, the steering column assembly increases the amount of energy absorbed as a result of axial movement of the column relative to the bracket. As such, the amount of energy absorbed by the steering column assembly may be altered as needed, even after installation into the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a collapsible steering column assembly is generally shown at 20. The steering column assembly 20 is for a motor vehicle, and is collapsible along a longitudinal axis L during a collision event to reduce possible injuries to a driver of the vehicle as is well known in the art.

Figure 1:
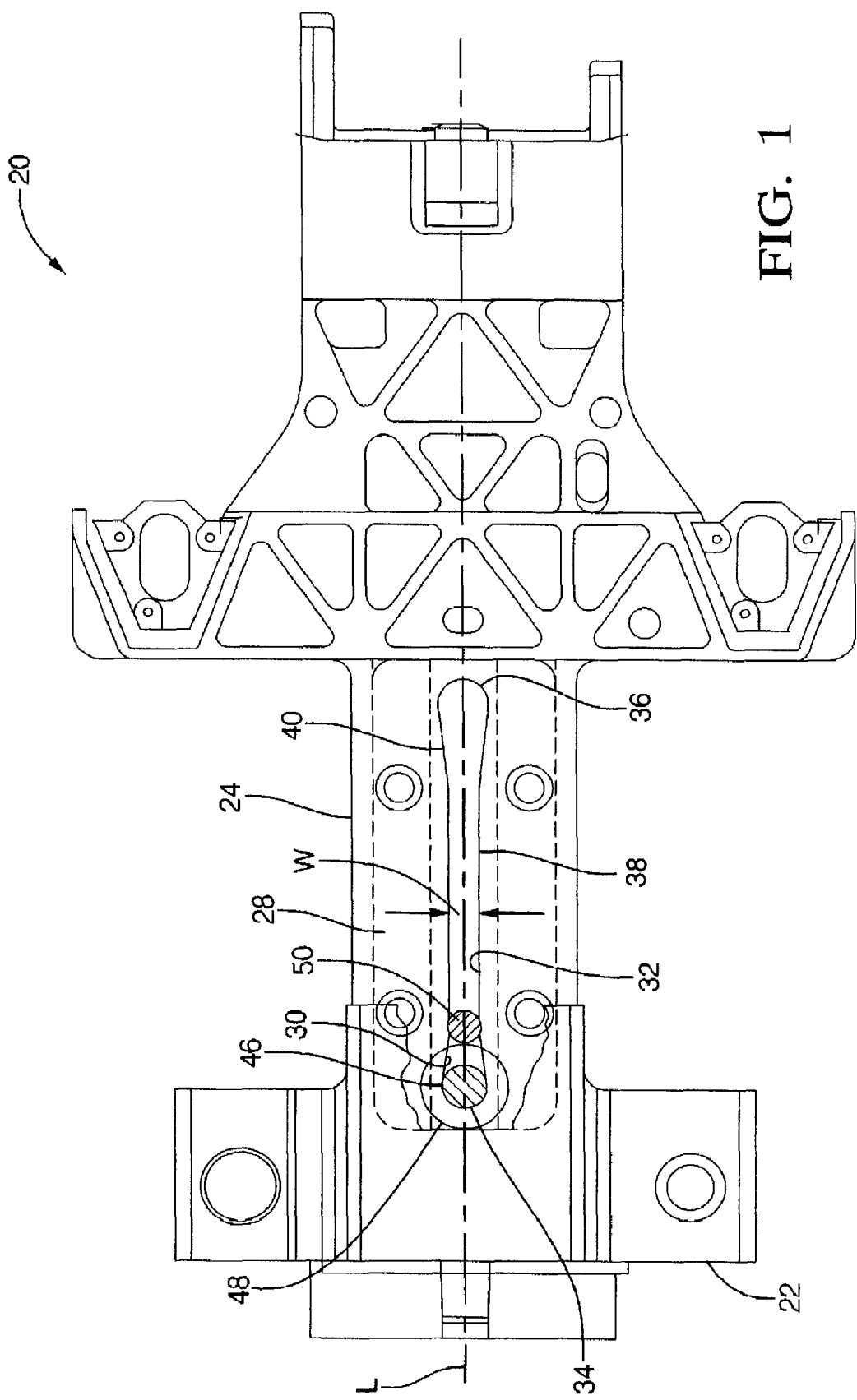
FIG. 1 is a top view of a steering column assembly having an energy absorbing device disposed thereon.
Figure 2:
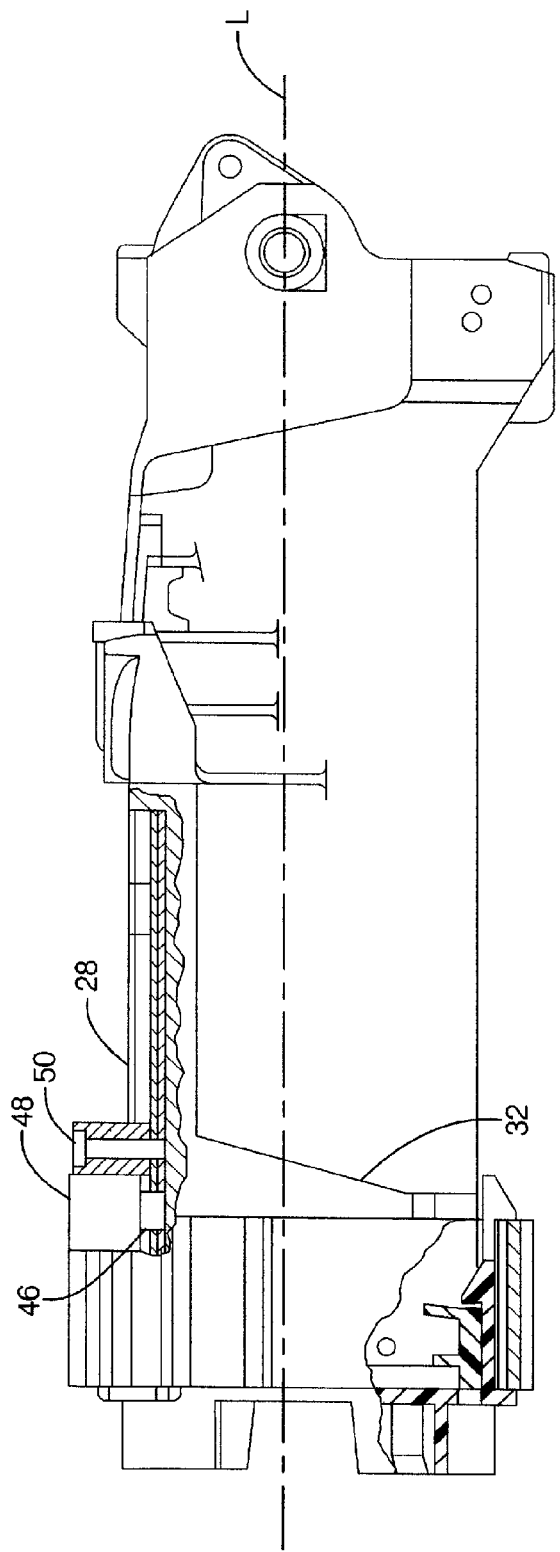
FIG. 2 is a side view of the steering column assembly.

Referring to FIGS. 1 and 2, the steering column assembly 20 comprises a bracket 22 for attaching the steering column assembly 20 to the vehicle, and further comprises a column jacket 24 moveable relative to the bracket 22 along the longitudinal axis L during the collision event. The column jacket 24 houses a steering shaft 26 as is well known in the art. It should be understood that the bracket 22 and the column jacket 24 are moveable relative to each other, and that either the bracket 22 or the column jacket 24 may move relative to the vehicle. In other words, the bracket 22 may be stationary relative to the vehicle with the column jacket 24 being moveable relative to the vehicle, or alternatively, the column jacket 24 may be stationary relative to the vehicle while the bracket 22 is moveable relative to the vehicle.

Figure 4:
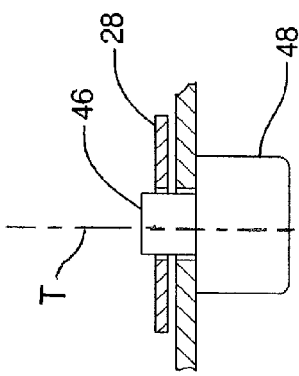
FIG. 4 is a side view of the energy absorbing device.
Figure 3:
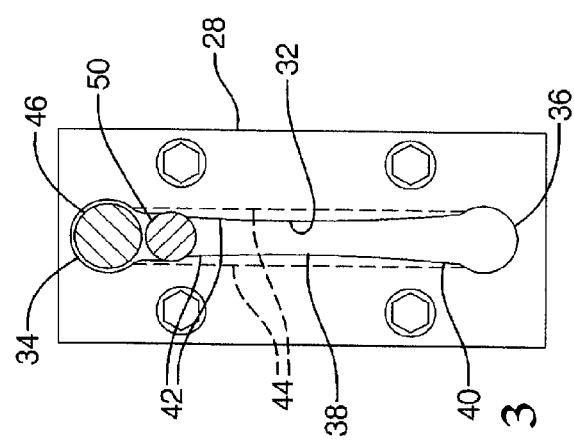
FIG. 3 is a top view of the energy absorbing device.

The steering column assembly 20 further comprises an energy absorption device for absorbing energy imparted into the steering column assembly 20 during the collision event. Referring to FIGS. 3 and 4, the energy absorption device includes a plate 28 (often referred to as a strap) coupled to one of either the bracket 22 and the column jacket 24. The plate 28 defines an opening 30 and a slot 32. The plate 28 is coupled to the bracket 22 or the column jacket 24 by bolts, passing through the plate 28 into threaded engagement with either the bracket 22 or the column jacket 24. It should be understood that the plate 28 may be coupled by other methods, such as welding. The opening 30 is preferably circular, but it should be understood that the opening 30 may include a shape other than circular. The slot 32 extends from the opening 30 parallel to the longitudinal axis L, and defines a pre-determined width W less than a diameter D of the opening 30.

The slot 32 defined by the plate 28 is in spaced relationship relative to the column. The spaced relationship permits the plate 28 to deform inward towards the column jacket 24 or outward away from the column jacket 24, and guarantees that the deformation of the plate 28 is not interfered with by the column jacket 24. It is important that the plate 28 deform consistently so as to provide a predictable rate of energy absorption.

The slot 32 includes a first end 34 adjacent the opening 30, and extends to a second end 36 a pre-determined distance from the first end 34. Preferably, the pre-determined width W of the slot 32 is constant, i.e., does not change between the first end 34 and the second end 36. However, it should be understood that the slot 32 may taper near the second end 36 to increase the pre-determined width W of the slot 32. It should also be understood that the slot 32 may include a portion having a constant pre-determined width W and a tapering pre-determined width W. Accordingly, as shown in FIG. 3, the slot 32 includes a straight portion 38 adjacent the first end 34 of the slot 32 and a tapered portion 40 adjacent the second end 36 of the slot 32. The plate 28 defines a planar surface and includes edges 42 adjacent the slot 32. The edges 42 adjacent the slot 32 curl away from the planar surface. The tapered slot 32 near the second end 36 cooperates with the opening 30 to permit the edges 42 adjacent the slot 32 to curl away from the planar surface by defining a tab 44 extending into the slot 32.

A pin 46 is coupled to one of either the bracket 22 and the column jacket 24. The pin 46 is horizontally moveable relative to the plate 28 along the horizontal axis during the collision event. The pin 46 includes a diameter D greater than the pre-determined width W of the slot 32 yet less than the diameter D of the opening 30. The pin 46 is transversely moveable along a transverse axis T relative to the plate 28 (FIG. 4). The pin 46 is moveable along axis T between a disengaged position, withdrawn from the opening 30, and an engaged position, extending into the opening 30 and engaging the slot 32 as shown in FIG. 4. In the engaged position, the pin 46 deforms the slot 32 in response to the horizontal movement of the plate 28 relative to the pin 46. It should be understood that the slot 32 may include a different geometry than specifically shown and described herein to accommodate differing design parameters and energy absorption requirements.

Figure 5:
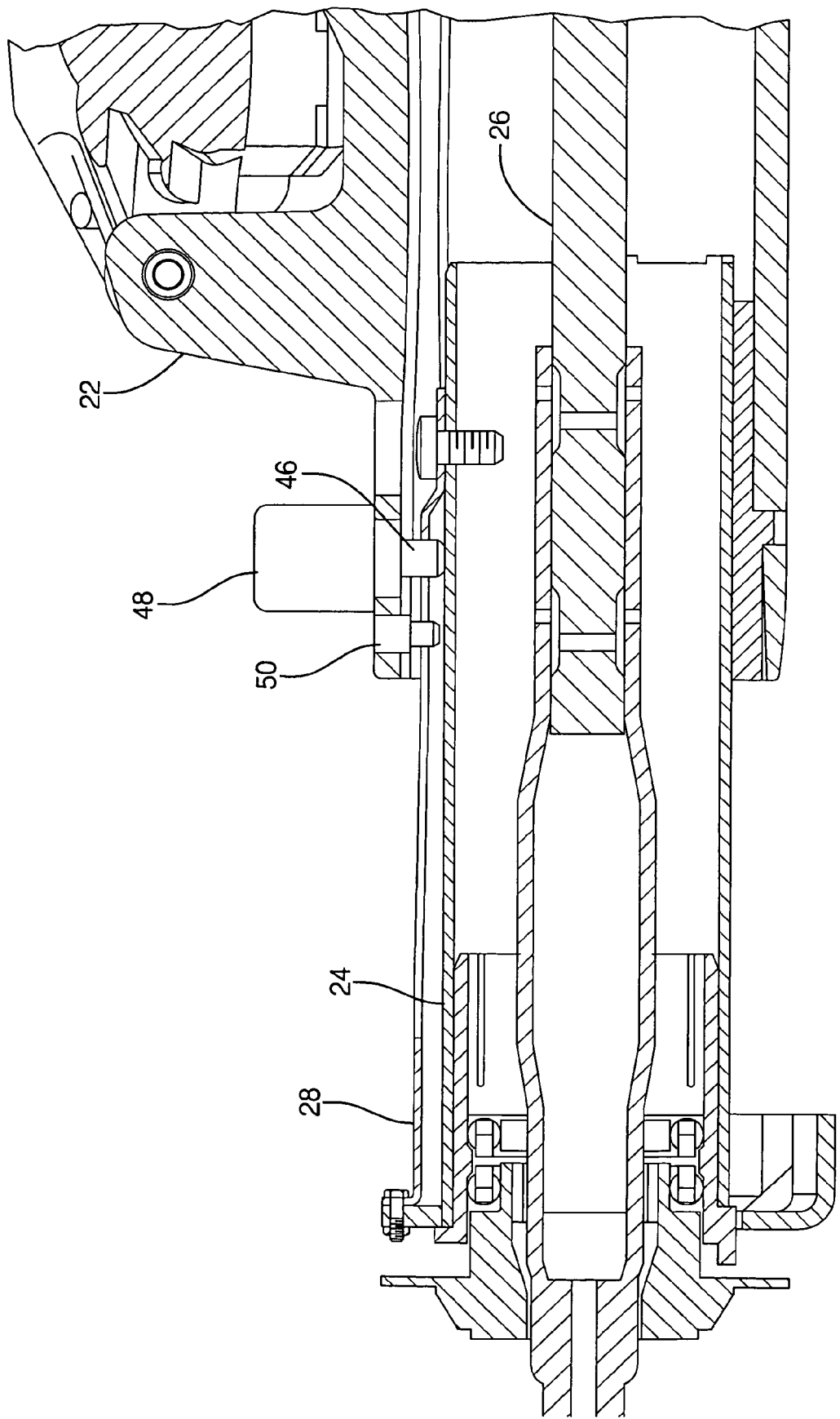
FIG. 5 is a cross sectional side view of an alternative embodiment of the steering column assembly.

Preferably, the plate 28 is coupled to the column jacket 24 and the pin 46 is coupled to the bracket 22. Alternatively however, as is shown in FIG. 5, it is contemplated that the plate 28 is coupled to the bracket 22 and the pin 46 is coupled to the column jacket 24. It should be understood that the pin 46 and the plate 28 must be coupled to the column jacket 24 and the bracket 22 for horizontal movement relative to each other, i.e., one of the pin 46 and the plate 28 must be attached to one of the column jacket 24 and the bracket 22, while the other of the pin 46 and the plate 28 must be attached to the other of the column jacket 24 and the bracket 22.

An actuator 48 is coupled to the pin 46 and interconnects the pin 46 and one of either the bracket 22 or the column jacket 24. The actuator 48 moves the pin 46 between the disengaged position and the engaged position in response to the collision event. Preferably, the actuator 48 includes a pyrotechnic device, but may alternatively include an electronic solenoid. It should be understood that the actuator 48 may include some other device capable of moving the pin 46 between the engaged position and the disengaged position in response to the collision event.

A post 50 is coupled to either one of the bracket 22 and the column jacket 24 and extends through the opening 30. The post 50 is interposed between the slot 32 and the pin 46 and includes a diameter D less than the diameter D of the pin 46 and greater than the pre-determined width W of the slot 32. The post 50 is horizontally moveable relative to the plate 28 along the horizontal axis during the collision event. Preferably, the post 50 is coupled to the bracket 22. It should be understood that when the post 50 is coupled to the bracket 22, the pin 46 is also coupled to the bracket 22. In the alternative, the post 50 may be coupled to the column jacket 24, with the pin 46 also being coupled to the column jacket 24.

A shown in FIGS. 1, 2 and 5, the post 50, as well as the actuator 48 and the pin 46, are fixed on the bracket 22. The bracket 22 is moveable relative to the jacket 24 along the longitudinal axis L. During the collision event, as the bracket 22 and the column jacket 24 collapse toward each other as a result of the collision event, the plate 28 will move along the longitudinal axis L toward the post 50 and the pin 46. The post 50, being rigidly affixed to either the column jacket 24 or the bracket 22 and always extending through the opening 30, will resist the longitudinal movement of the plate 28. The post 50 having a larger diameter D than the pre-determined width W of the slot 32 accomplishes the resistance provided by the post 50. Therefore, as the plate 28 moves longitudinally toward the post 50, the post 50 deforms the edges 42 of the slot 32, widening the slot 32 until the pre-determined width W equals the diameter D of the post 50 to permit the longitudinal movement of the plate 28 relative to the post 50. The amount of energy absorbed as a result of the deformation of the slot 32 by the post 50 is dependent upon the material properties of the plate 28 and the post 50, i.e., the material strength, resistance to bending, the speed of impact, as well as the geometric properties of the slot 32 and the post 50, i.e., how far must the post 50 deform the edges 42 of the slot 32 to permit the longitudinal movement.

During a severe collision, the energy imparted to the steering column assembly 20 will be greater. To better protect the occupant, the energy absorbing device can be set to provide additional energy absorbing capabilities. When a collision is sensed to be severe, prior to impact of the column, actuator 48 is signaled to extend the pin 46 into the opening 30. Since the pin 46 includes a diameter D larger than the diameter D of the post 50, the pin 46 follows the post 50 through the slot 32, further deforming the edges 42 of the slot 32 beyond the deformation caused by the post 50. As in the interaction between the plate 28 and the post 50 described above, the amount of energy absorbed as a result of the deformation of the slot 32 by the pin 46 is dependant upon the material properties of the plate 28 and the pin 46, and the geometric properties of the slot 32 and the pin 46.

Accordingly, the energy absorption device may be calibrated to provide for two different stages of energy absorption. A first stage in which just the post 50 interacts with the plate 28 to absorb energy, and a second stage in which both the post 50 and the pin 46 interact with the plate 28 to absorb energy.

Figure 6:
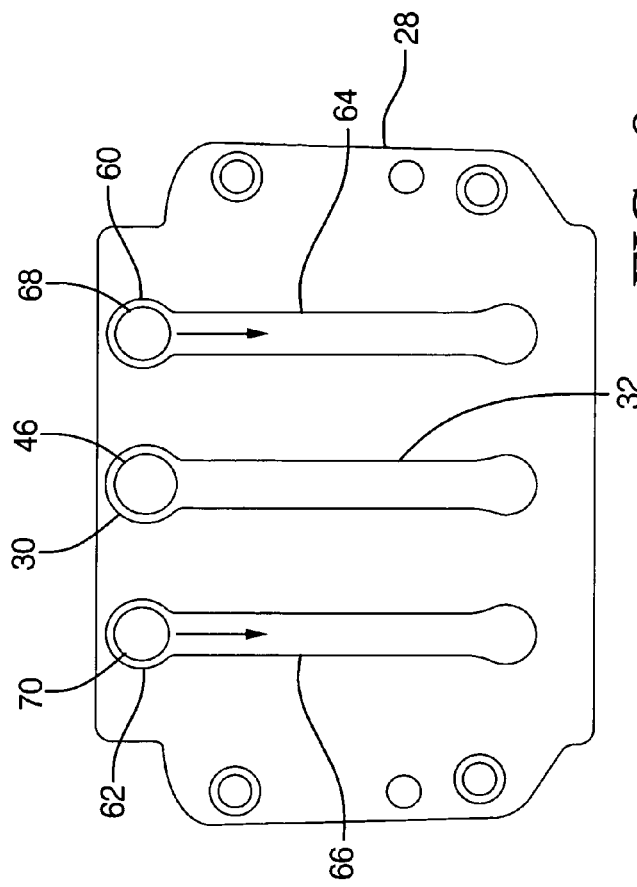
FIG. 6 is a top view of a first alternative embodiment of the energy absorbing device.
Figure 7:
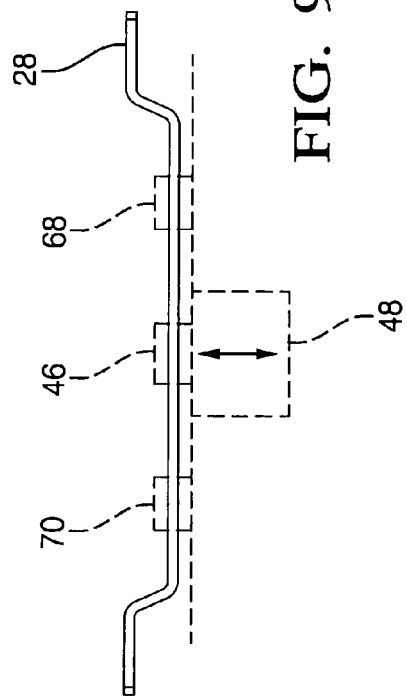
FIG. 7 is a side view of the first alternative embodiment of the energy absorbing device shown in FIG. 6.

In a first alternative embodiment of the energy absorption device shown in FIGS. 6 and 7, the opening 30 includes a primary opening 52 and a high load opening 54. The slot 32 includes a primary slot 56 adjacent the primary opening 52 and a high load slot 58 adjacent the high load opening 54. The post 50 extends through the primary opening 52, while the pin 46 is transversely moveable along its axis T (FIG. 4) relative to the plate 28 into the high load opening 54 in the engaged position. Accordingly, the pin 46 and the post 50 deform separate slots 32 in response to the longitudinal movement of the plate 28. It should be understood, with reference to a second and a third embodiments of the energy absorption device described below, that the number of slots 32 and corresponding number of the posts 50 and the pins 46 may be varied to accommodate specific design requirements.

Figure 8:
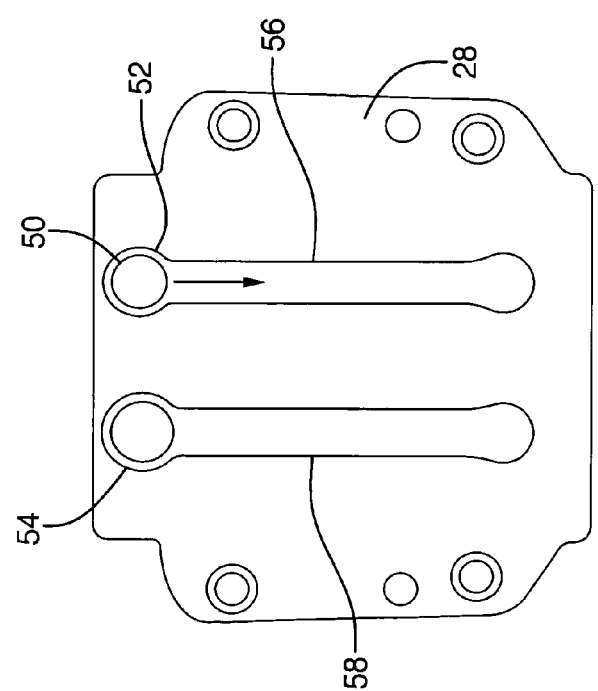
FIG. 8 is a top view of a second alternative embodiment of the energy absorbing device.
Figure 9:
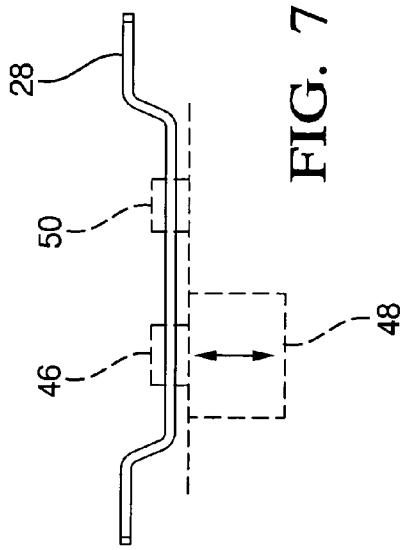
FIG. 9 is a side view of the second alternative embodiment of the energy absorbing device shown in FIG. 8.

In the second alternative embodiment of the energy absorption device shown in FIGS. 8 and 9, the primary opening 52 includes a first primary opening 60 and a second primary opening 62. The primary slot 56 includes a first primary slot 64 adjacent the first primary opening 60 and a second primary slot 66 adjacent the second primary opening 62. The post 50 includes a first post 68 extending through the first primary opening 60 and a second post 70 extending through the second primary opening 62. The pin 46 is transversely moveable along its axis T (FIG. 4) relative to the plate 28 into the opening 30 adjacent the slot 32. As described above, the bracket 22 is moveable relative to the jacket 24 along the longitudinal axis L.

Figure 10:
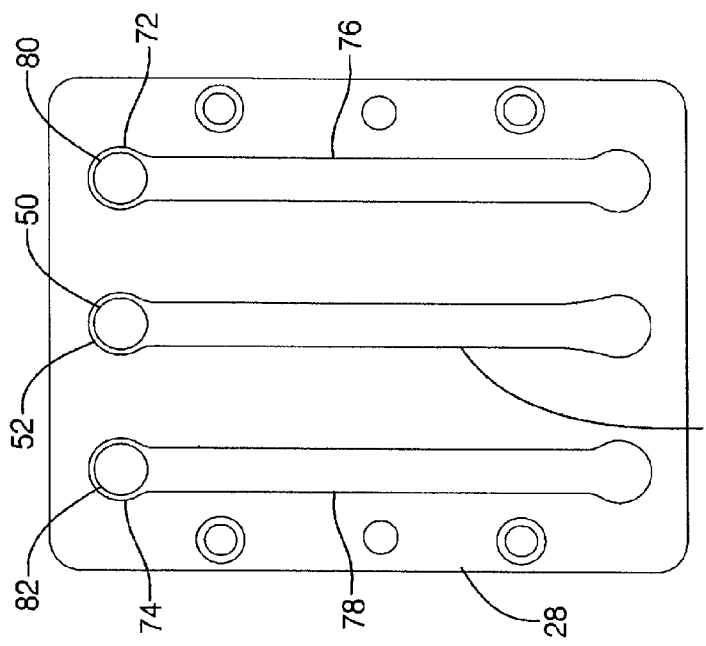
FIG. 10 is a top view of a third alternative embodiment of the energy absorbing device.
Figure 11:
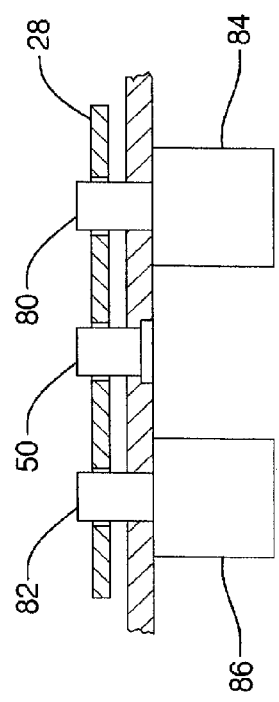
FIG. 11 is a side view of the third alternative embodiment of the energy absorbing device shown in FIG. 10.

In the third alternative embodiment of the energy absorption device shown in FIGS. 10 and 11, the high load opening 54 includes a first high load opening 72 and a second high load opening 74. The high load slot 58 includes a first high load slot 76 extending from the first high load opening 72 and a second high load slot 78 extending from the second high load opening 74. The pin 46 includes a first pin 80 transversely moveable along its axis T (FIG. 4) relative to the plate 28 into the first high load opening 72 in the engaged position, and a second pin 82 transversely moveable along its axis T (FIG. 4) relative to the plate 28 into the second high load opening 74 in the engaged position. As in the first alternative embodiment, the post 50 extends through the primary opening 52. The actuator 48 includes a first actuator 84 for moving the first pin 80 between the disengaged position and the engaged position, and a second actuator 86 for moving the second pin 82 between the disengaged position and the engaged position.

Accordingly, the third alternative embodiment of the energy absorption device provides three stages of energy absorption capabilities. In a first stage, the first pin 80 and the second pin 82 are in the disengaged position, therefore only the post 50 interacts with the plate 28 to provide the energy absorption capabilities. In a second stage, the first pin 80 is in the engaged position and the second pin 82 is in the disengaged position, therefore the post 50 and the first pin 80 interact with the plate 28 to provide the energy absorption capabilities. In a third stage, both the first pin 80 and the second pin 82 are in the engaged position, therefore the post 50 and both the first pin 80 and the second pin 82 interact with the plate 28 to provide the energy absorption capabilities.

Figure 12:
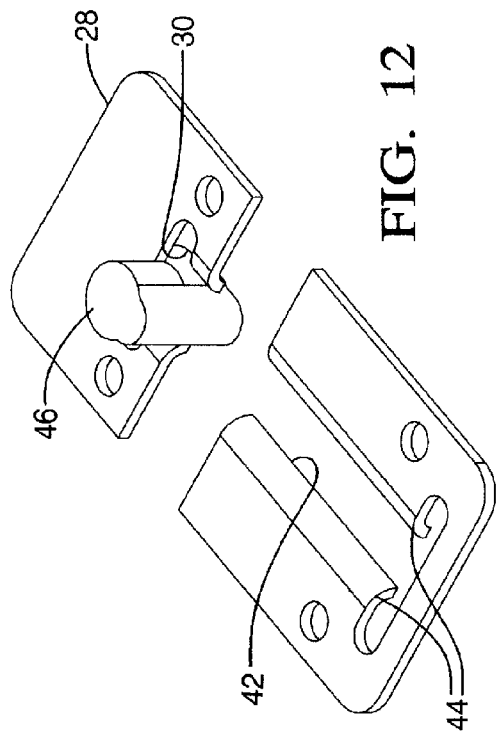
FIG. 12 is a top view a fourth alternative embodiment of the energy absorbing device.
Figure 13:
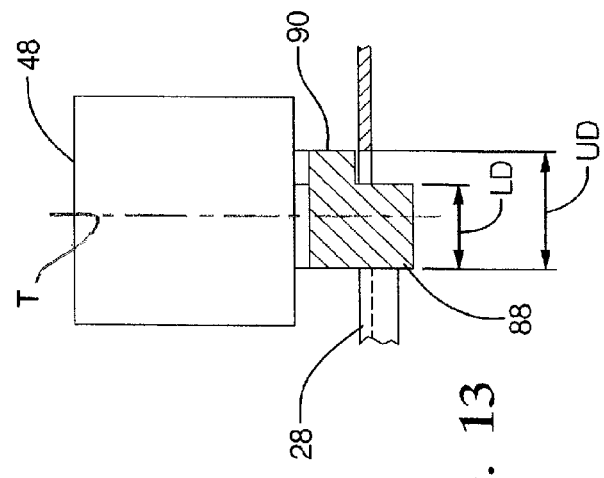
FIG. 13 is a side view of the fourth alternative embodiment of the energy absorbing device shown in FIG. 12.

In a fourth alternative embodiment of the energy absorption device shown in FIGS. 12 and 13, the pin 46 includes a lower portion 88 having a lower diameter LD and an upper portion 90 having an upper diameter UD. The upper diameter UD of the pin 46 is greater than the lower diameter LD of the pin 46. The lower portion 88 is transversely moveable along pin axis T relative to the plate 28 into the opening 30 for engagement with the slot 32 in a first engaged position. The upper portion 90 is transversely moveable along pin axis T relative to the plate 28 into the opening 30 for engagement with the slot 32 in a second engaged position.

The foregoing invention has been described in accordance with the relevant legal standards; thus, the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. A collapsible steering column assembly for a vehicle, said assembly comprising:
   a bracket for attachment to the vehicle;
   a column jacket moveable relative to said bracket along a longitudinal axis during a collision event;
   a plate coupled to one of said bracket and said column jacket with said plate defining an opening and a slot extending from said opening parallel to said longitudinal axis with said slot defining a pre-determined width; and
   a pin coupled to one of said bracket and said column jacket and horizontally moveable relative to said plate along said longitudinal axis during the collision event with said pin including a diameter greater than said pre-determined width of said slot and transversely moveable along a transverse axis relative to said plate between a disengaged position withdrawn from said opening and an engaged position extending into said opening and engaging said slot for deforming said slot in response to said horizontal movement of said plate relative to said pin.

2. An assembly as set forth in claim 1 further comprising an actuator coupled to said pin and interconnecting said pin and one of said bracket and said column jacket for moving said pin between said disengaged position and said engaged position.

3. An assembly as set forth in claim 2 wherein said actuator includes a pyrotechnic device.

4. An assembly as set forth in claim 2 wherein said actuator includes an electronic solenoid.

5. An assembly as set forth in claim 2 wherein said plate is coupled to said column jacket and said pin is coupled to said bracket.

6. An assembly as set forth in claim 1 wherein said slot is in spaced relationship relative to said column.

7. An assembly as set forth in claim 6 wherein said slot includes a first end adjacent said opening and extends to a second end a pre-determined distance from said first end with said slot having a pre-determined width along said pre-determined distance.

8. An assembly as set forth in claim 7 wherein said slot near said second end tapers to increase said pre-determined width of said slot along said pre-determined distance.

9. An assembly as set forth in claim 7 wherein said plate defines a planar surface and includes edges adjacent said slot and curled away from said planar surface.

10. An assembly as set forth in claim 1 further comprising a post coupled to one of said bracket and said column jacket and extending through said opening interposed between said slot and said pin and having a diameter less than said diameter of said pin and greater than said pre-determined width of said slot with said post horizontally moveable relative to said plate along said horizontal axis during the collision event.

11. An assembly as set forth in claim 10 wherein said post is coupled to said bracket.

12. An assembly as set forth in claim 7 further comprising a post coupled to one of said bracket and said column jacket, and wherein said opening includes a primary opening and a high load opening and wherein said slot includes a primary slot adjacent said primary opening and a high load slot adjacent said high load opening with said post extending through said primary opening and said pin transversely moveable relative to said plate into said high load opening in said engaged position.

13. An assembly as set forth in claim 12 wherein said high load opening includes a first high load opening and a second high load opening and said high load slot includes a first high load slot extending from said first high load opening and a second high load slot extending from said second high load opening and said pin includes a first pin transversely moveable relative to said plate into said first high load opening in said engaged position and a second pin transversely moveable relative to said plate into said second high load opening in said engaged position.

14. An assembly as set forth in claim 13 wherein said actuator includes a first actuator for moving said first pin between said disengaged position and said engaged position and a second actuator for moving said second pin between said disengaged position and said engaged position.

15. An assembly as set forth in claim 2 wherein said pin includes a lower portion having a lower diameter and an upper portion having an upper diameter greater than said lower diameter with said lower portion transversely moveable relative to said plate into said opening for engagement with said slot in a first engaged position and said upper portion transversely moveable relative to said plate into said opening for engagement with said slot in a second engaged position.

* * * * *